(12) United States Patent
Walker

(10) Patent No.: US 8,825,562 B2
(45) Date of Patent: Sep. 2, 2014

(54) METHOD FOR A SYSTEM THAT INDEXES, RANKS, AND CLUSTERS MULTIMEDIA DOCUMENTS

(75) Inventor: Reginald L Walker, Los Angeles, CA (US)

(73) Assignee: Tapicu, Inc., Los Angeles, CA (US)

( * ) Notice: Subject to any disclaimer, the term of this patent is extended or adjusted under 35 U.S.C. 154(b) by 506 days.

(21) Appl. No.: 13/135,943

(22) Filed: Jul. 19, 2011

(65) Prior Publication Data

US 2012/0016819 A1    Jan. 19, 2012

Related U.S. Application Data

(60) Provisional application No. 61/399,961, filed on Jul. 19, 2010.

(51) Int. Cl.
*G06F 15/18* (2006.01)
*G06F 17/30* (2006.01)

(52) U.S. Cl.
CPC ................... *G06F 17/3002* (2013.01)
USPC ........................................................ 706/12

(58) Field of Classification Search
None
See application file for complete search history.

(56) References Cited

U.S. PATENT DOCUMENTS

2010/0174730 A1 *   7/2010   Leung et al. ................... 707/758

OTHER PUBLICATIONS

Deb, Kalyanmoy, et al. "A fast and elitist multiobjective genetic algorithm: NSGA-II." Evolutionary Computation, IEEE Transactions on 6.2 (2002): 182-197.*

Reginald Louis Walker (2003) "Tocorime Apicu: Design of an Experimental Search Engine Using an Information Sharing Model", University of California Dissertation, UMI Dissertation Publishing, Ann Arbor, MI 48106-1346.*
Cui, Xiaohui, Jinzhu Gao, and Thomas E. Potok. "A flocking based algorithm for document clustering analysis." Journal of systems architecture 52.8 (2006): 505-515.*
Casillas, Arantza, MT González De Lena, and R. Martínez. "Document clustering into an unknown number of clusters using a genetic algorithm." Text, Speech and Dialogue. Springer Berlin Heidelberg, 2003.*
Walker, Reginald L. "Dynamic load balancing model: Preliminary assessment of a biological model for a pseudo-search engine." Parallel and Distributed Processing. Springer Berlin Heidelberg, 2000. 620-627.*
Juillé, Hugues. "Evolution of non-deterministic incremental algorithms as a new approach for search in state spaces." (1995).*
Ahmad, Ishfaq, et al. "Evolutionary algorithms for allocating data in distributed database systems." Distributed and Parallel Databases 11.1 (2002): 5-32.*
Walker, Reginald L. "Hierarchical task topology for retrieving information from within a simulated information ecosystem." Journal of network and computer applications 28.2 (2005): 77-96.*

(Continued)

*Primary Examiner* — Kakali Chaki
*Assistant Examiner* — Daniel Pellett

(57) ABSTRACT

A method for a system that indexes, ranks, and clusters multimedia documents using organizing means, scoring means, and stochastic means that optimizes parameter sets comprising of object parameters. The method creates a plurality of individual parameter sets, the parameter sets comprising information sharing system object parameters for describing a structures, search query sets, and dynamic search spaces to be optimized and setting the population of individuals as a population of memes. These parameters are required to filter, organize, and index any large-scale data set—information stored on a single computer, a local area network (LAN), and a wide area network (WAN) that encompasses the whole Internet—that may consists of constantly fluctuating information content over relatively short periods of time.

13 Claims, 1 Drawing Sheet

(56) References Cited

OTHER PUBLICATIONS

Walker, Reginald L. "Honeybee search strategies: adaptive exploration of an information ecosystem." Evolutionary Computation, 2004. CEC2004. Congress on. vol. 1. IEEE, 2004.*

Pham, D. T., and Afshin Ghanbarzadeh. "Multi-objective optimisation using the bees algorithm." Proceedings of IPROMS 2007 Conference. 2007.*

Walker, Reginald L. "Parallel clustering system using the methodologies of evolutionary computations." Evolutionary Computation, 2001. Proceedings of the 2001 Congress on. vol. 2. IEEE, 2001.*

Walker, Reginald L. "Purposive behavior of honeybees as the basis of an experimental search engine." Soft Computing 11.8 (2007): 697-716.*

Pham, D. T., et al. "The bees algorithm—a novel tool for complex optimisation problems." Proceedings of the 2nd Virtual International Conference on Intelligent Production Machines and Systems (IPROMS 2006). 2006.*

Walker, Reginald L. "Using the Purposive Behavior of Honeybees as the Basis of an Experimental Search Engine." Soft Computing as Transdisciplinary Science and Technology. Springer Berlin Heidelberg, 2005. 967-976.*

* cited by examiner

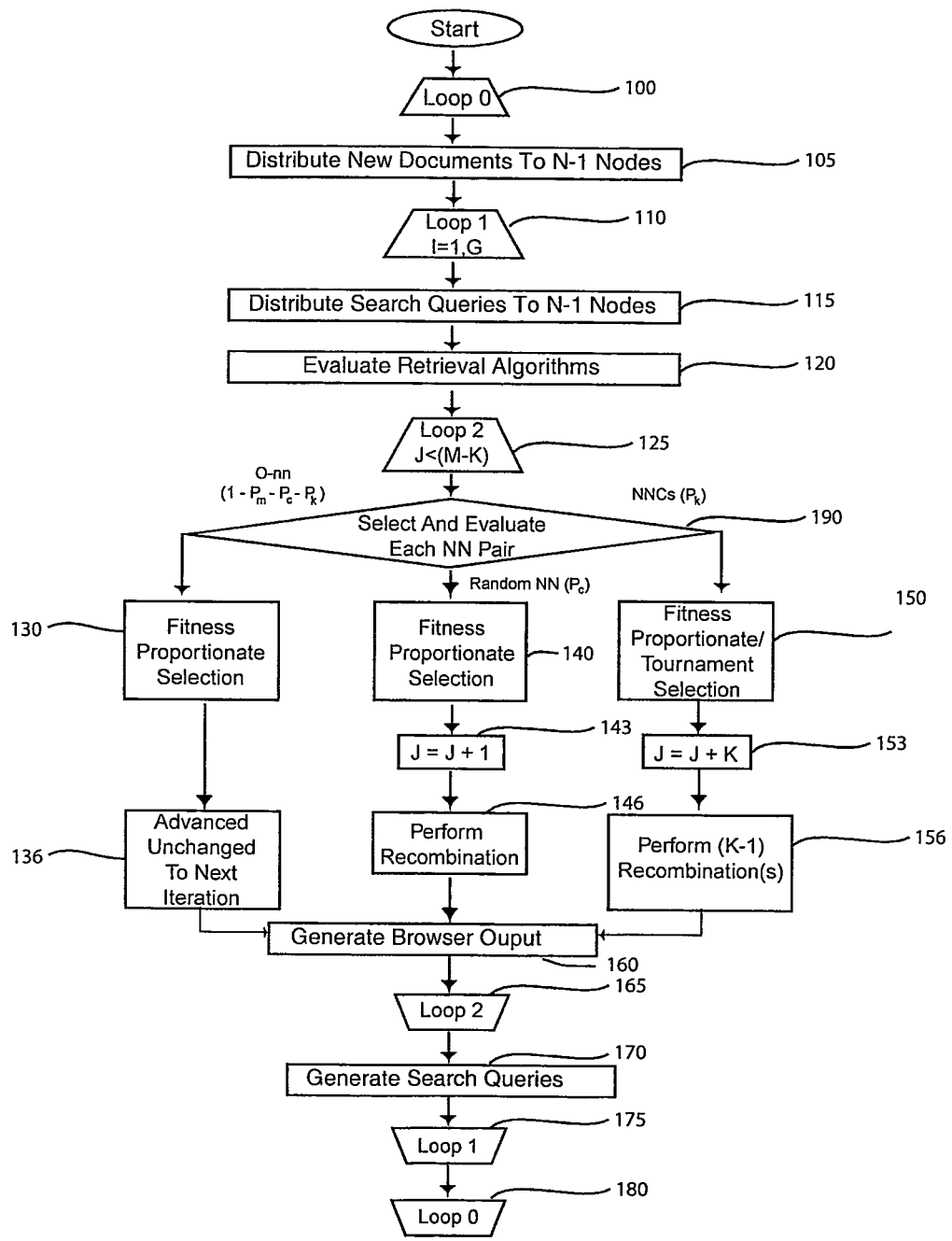

METHOD FOR A SYSTEM THAT INDEXES, RANKS, AND CLUSTERS MULTIMEDIA DOCUMENTS

CROSS-REFERENCE TO RELATED APPLICATIONS

This application claims benefit of provisional application Ser. No. 61/399,961, filed on Jul. 19, 2010 by the present inventor.

FEDERALLY SPONSORED RESEARCH

Not Applicable

SEQUENCE LISTING OR PROGRAM

Not Applicable

BACKGROUND OF THE INVENTION

The invention relates generally to the optimizing of object parameters for describing a model, structure, shape, design, or process, for an information sharing indexer system. In particular, it relates to the stochastic optimization of evolutionary computation (EC) search strategy parameters for multimedia indexers for information sharing indexer systems such as search engines, data warehouses, and service oriented architectures (SOAs). The field of evolutionary computation encompasses stochastic optimization techniques, such as randomized search strategies, in the form of evolutionary strategies (ES), evolutionary programming (EP), genetic algorithms (GA), classifier systems, evolvable hardware (EHW), and genetic programming (GP).

There has always been a need to iteratively improve the clustering and ranking of multimedia documents. The stochastic optimization techniques of evolutionary computation (EC) contain mechanisms which enable the representation of certain unique aspects of individual behavior to improve document clustering. Principles of the stochastic optimization techniques of EC can be found for example in Reginald Louis Walker (2003) "*Tocorime Apicu: Design of an Experimental Search Engine Using an Information Sharing Model*", University of California Dissertation, UMI Dissertation Publishing, Ann Arbor, Mich. 48106-1346, which is incorporated by reference herein in its entirety.

The chief differences among the various types of EC stemming from: 1) the representation of solutions (known as individuals in EC), 2) the design of the variation operators (mutation and/or recombination—also known as crossover), and 3) selection mechanisms. A common strength of these optimization approaches lies in the use of hybrid algorithms derived by combining two or more of the evolutionary search methodologies. The underlying optimization methodologies of EC are used to implement unique stochastic aspects of search strategies that are combined with information retrieval methodologies. This mapping is extended by supplementing the search strategies with finding hidden knowledge in a collection of multimedia documents—related and/or unrelated—using search query sets. Canonical multimedia documents are generated to reduce the workload and storage requirements of the system, resulting in a set of condensed multimedia documents forming the data store. The system continuously repartitions the stored document space among a set of nodes whose goal is to form subclusters of nodes for redistributing the workload. The subclusters are formed by using the information retrieval (IR) algorithm metrics coupled with two or more evolutionary search strategies as the basis of nearest neighbor clusters (NNC) among multimedia indexers. Fitness proportionate and tournament selection in this application forms the basis of nearest neighbor clustering, providing the mechanism for, selecting nodes that will share information. Mutations and recombinations are implemented as random change (or multiple changes) of the description of the finite state machine (FSM) according to five different modifications: change of an output symbol, change of a state transition, addition of a state, deletion of a state, or change of the initial state.

BACKGROUND OF THE INVENTION

Objectives

Accordingly, the objectives and advantages of the invention are as follows:

It is an objective of the present invention to use hybrid algorithms derived by combining one or more of the information retrieval methodologies with one or more of the evolutionary computation search methodologies.

It is another objective of the present invention is to provide a stochastic selection process that iteratively improves a population of solutions—evolving sets of competing solutions over the space being searched. The components of an optimization application are:

1. Terminal set. Input variables or constants.
2. Function set. Domain-specific functions that construct potential solutions.
3. Fitness measure(s). Function(s) that assign numeric values to the individuals associated with a population (set of solutions that comprise the solution space).
4. Algorithm control parameters. Settings dependent on population size and workload redistribution (recombination and mutation) rates.
5. Termination criterion. Predicate that uses fitness measures to determine the appropriateness of a population based on tolerances or limits on the number of allowable generations/iterations.

It is another objective of the present invention to represent solutions as memes to reduce in the computational effort to achieve the periodic optimal document clusters. The fitness of a species (adaptive and iterative grouping of the solutions from selective indexers) can be improved by the non-genetic transmission of cultural information that uses a meme as the transmission mechanism rather than the genetically based gene. The difference between the two includes the fact that genetic transmissions (stochastic selection process) evolve over a period of generations, whereas cultural transmissions result from an educational process.

It is another objective of the present invention to use a function set that consists of a multimedia parser that works as a two-pass parser. The initial pass occurs as a component of the system that applies document layout analysis for its automated retrieval component. The second pass applies a full set of text-processing modules consisting of syntactic analysis, lexical analysis, layout analysis, and feature recognition. Layout analysis transforms a raw document into an application-specific document by saving the canonical format structural information as necessary. The syntactic analysis component verifies that the canonical structure adheres to a suitable format. The lexical analysis module is combined with the feature recognition module. These modules remove stop words, identify and record word boundaries, and index words for retrieval. Additionally, this component is responsible for converting hyphenated and sequences of capitalized words into proximity constraints, and case conversions into compressed inverted files.

It is another objective of the present invention to continuously apply algorithm control parameters to improve the subclustering of documents in distributive applications leading to disjoint nodes for chosen sets of search queries.

It is another objective of the present invention to continuously adjust the operational parameters required to filter, organize, and index any large-scale data set—information stored on a single computer, a local area network (LAN), and a wide area network (WAN) that encompasses the whole Internet—that may consists of constantly fluctuating information content over relatively short periods of time.

SUMMARY OF THE INVENTION

The invention is a system and method for indexing, ranking, and clustering multimedia documents using hybrid search strategies and the stochastic optimization techniques of evolutionary computation (EC). These stochastic optimization techniques form the basis of a regulatory mechanism for sharing information document clustering and ranking which leads to the migration of multimedia documents between multimedia indexers. The iterative application of these mechanisms improves the subclustering of multimedia documents in distributive applications leading to disjoint nodes for chosen sets of search queries.

It is to be understood that both foregoing general description and the following detailed description for the present invention are exemplary and explanatory and are extended to provide further explanation of the invention as claimed.

DETAILED DESCRIPTION OF THE DRAWINGS

Figures

FIG. 1 is a schematic flow diagram of the optimization method of the present invention.

DETAILED DESCRIPTION

Preferred Embodiments

A preferred embodiment of the present invention is now described with reference to the figures where like reference numbers indicate identical or functionally similar elements.

Some portions of the detailed descriptions that follow are presented in terms of algorithms and symbolic representations of operations on data bits within a computer memory. These algorithmic descriptions and representations are the means used by those skilled in data processing art to most effectively convey the substance of their work to others skilled in the art. Algorithms are here, and generally, conceived to be self-consistence sequence of steps (instructions) leading to desired results. The steps are those requiring physical manipulations of physical quantities.

Certain aspects of the present invention include process steps and instructions described herein in the form of an algorithm. It should be noted that the process steps and instructions of the present invention could be embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in a computer. Furthermore, the computers referred to in the specifications may include a single processor or may be architectures employing multiple processors designed for increased computing capability.

The algorithms and displays presented herein are not inherently related to any particular computer of other apparatus. Various general-purpose systems may also be used with programs in accordance with the teaching herein; or it may prove convenient to construct more specialized apparatus to perform the required method steps. The required structure for a variety of these systems will appear from the description below. In addition, the present invention is not described with reference to any programming language. It will be appreciated that a variety of programming languages may be used to implement the teachings of the present invention as describe herein, and any references below to specific languages are provided for disclosure of enablement and best mode of the present invention.

In addition, the language used in the specification has been principally selected for readability and instructional purposes, and may not have been selected to delineate or circumscribed the invention subject matter. Accordingly, the disclosure of the present invention is intended to be illustrative, but not limiting, of the scope of the invention, which is set forth in the claims.

1. Notational Conventions a. Applying the EC Search Strategies to Stochastic Information Fluctuations FIG. 1 shows an embodiment of the invention which performs the tasks associated with regulating the formulation of NNCs and adapting to information fluctuations. The tasks performed are:

1. Periodic partitioning of the multimedia document dataset among indexer nodes 105
2. Generating workload assignments (resulting from fitness proportionate selection steps) for each node 105
3. Distributing dynamic workload assignments 105 and dynamic search query sets 115
4. Formulating NNCs using fitness proportionate selection 190
5. Selecting source of dynamic search query sets 170
6. Repeating step 1 through 5 100-180

The traditional EC approach for the recombination and mutation operators, as well as the normal (steady-state) approach, is restricted to one application per iteration for a single set of solutions. The load-balancing model of the multimedia document indexing system uses the EC recombination operator by restricting information sharing between members of disjoint node sets (species) which are chosen in a process that selects and evaluate each nearest neighbor (NN) pair 190.

NNCs 190 can occur as one of three types based on the number of neighborhood seeds: 1) random seeds, 2) multiple seeds, or 3) overlapping seeds. The occurrence of multiple and overlapping seeds enhances the quality of the total cluster's solution space via the modification of the workload assignments of several nodes during one iteration (superstep).

The iterative formulation of NNCs 125,190 was implemented using the notion of an expandable search space which facilitates adaptive subclusters on an iteration-by-iteration basis. The selection process 190 can be applied multiple times 153, where one node is the NN seed for one or more nodes— thus providing a stochastic hybrid of the recombination and mutation operators 130,140,150.

b. Formulation of Nearest Neighbor Clusters (NNCs)

K-nearest neighbors (K-nn) 190,130,136 is implanted as the mutation operator when K=0.

Random NN 190,140,143,146 are implemented as follows: 1) the first node is randomly chosen, and 2) the second node is chosen by incrementing the node ID of the first node 190, thereby mimicking the ring communication pattern based on the rank in order to determine adjacent nodes. Recombination is applied to the selected nodes 140,143,146 for each iteration 125-165. The proportionate fitness method 140 assigns a random number to each neighborhood seed and selects individuals by repeatedly choosing various random numbers until one matches a node's random number.

Multiple neighborhoods (NNCs) 190,150,153,156 exists when there are at least one or more NNCs in which neighborhoods do not overlap. When a single node is a nearest neighbor of two disjoint NNCs, this node may be selected 150 as a NN one or more times based on the existence of one or more completing nodes in the disjoint neighborhoods. The selection of a node when two or more are present in a single neighborhood occurs via proportionate fitness selection 150.

Overlapping neighborhoods 190,150,153,156 occur when two or more NNCs are formed from the seeds overlapping neighborhoods. The selection of one of the NNCs 150 from overlapping of neighborhoods occurs via two "popular" selection methodologies: 1) the proportionate fitness or roulette wheel selection, and 2) the tournament selection. The proportionate fitness method 150 assigns a random number to each node and selects individuals choosing various random numbers which may match an individual's random number.

The selection processes 190,150 for overlapping neighborhoods uses the radius of two or more nodes resulting in possibly K-nn per cluster by performing the following:

1. Randomly selects one of the overlapping nodes as the seed of one of the NNCs using the tournament selection method 150
2. Using roulette wheel selection 150
   a. Randomly selects a node for recombination
   b. Randomly selects a range for recombination
   c. Performs recombination 156 on the two nodes only if they are NN using proportionate fitness method 150
3. If necessary, repeats step 2 125-165

The number of iterations 156 a selected node is used for recombination is random—this potentially providing the node with an emulator of the mutation operator 130 (occurring if the selected node was previously selected during an application of the recombination operator). However, the same node may be chosen for two or more iterations with the possibility of swapping previously exchanged recombinations. The system does not advance until k possible recombinations 156 have been completed. The occurrence of overlapping NNCs regulates the recombination rate and the selection rate. The recombination rate and the selection rate use the information retrieval algorithms to generate stochastic metrics for determining nearest neighbor (NN) resulting in the emergence of subclustering within each cluster/subcluster since each meme is maintained throughout this application.

Another component of the recombination rate and the selection rate stems from overlapping nearest neighbor clusters (NNCs) and is equivalent to sharing information between diverse set of computer processors and/or systems. This phenomenon adds random noise to the whole process by creating, at most K-nn in one component of a superstep based on overlapping NNCs—an event which is beneficial to the prevention of premature convergence and to the incorporation of various optimization techniques such as supersteps and dissassortive mating when selecting nodes from initial subclusters such subspecies A and B. Supersteps resulted from two or more applications of the recombination operator during one iteration (generation) via overlapping NNCs or multiple disjoint NNCs. Dissassortive selection is a results of selecting NN for the recombination operator from a disjoint list of disjoint subcluster members, as in the case of random NN using the even nodes as one cluster of individuals and the odd nodes as a subcluster.

c. Input Parameters

The methodology used in retrieval calculations 120—computing the stochastic measurements—was based on: 1) generating the canonical representation of the raw multimedia documents—an application-specific document of structural information, and 2) applying the stochastic optimization retrieval algorithms to determine NNCs 190—computing the raw fitness, standardized fitness, and adjusted fitness.

d. Synchronization Points

FIG. 1 provides periodic synchronization points 165,175, 180 used for consistency restoration. Using a self-scheduling policy, the load-balancing model distributes the multimedia documents 105 that comprise the document dataset for each iteration. This random approach to the distribution of documents enables the system to adapt to each machine's characteristics at various stages of this iterative process 100-180. By requiring that each node start each iteration 100,110,125 on the basis of a consistent state, the synchronization points are used to restore a consistent global state. FIG. 1 allows for continuous updates and redistribution of multimedia documents 105,115,160,170 which incorporate the local and system-wide computational parameter adjustments.

The need for synchronization points 165,175,180 can be traced to scientific applications that are known to exhibit a diverse set of I/O access patterns. These are known as:

1. Compulsory
2. Checkpoint/restart
3. Regular snapshots of the computation's progress
4. Out-of-core read/writes
5. Continuous output of data for visualization and other post-processing The variability in the canonical document size accounts for the seemingly high random file accesses. Combining the file access patterns of all the indexers in the system reflects their compulsory nature. The synchronization points 165,175,180 provide the I/O checkpoints. The regular snapshots of the computation's progress are reflected in the intermediate solutions 160,170 that are created at the end of each iteration 165,175,180.

While particular embodiments and applications of the present invention have been illustrated and described herein, it is understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

I claim:

1. A method for indexing, ranking, and clustering multimedia documents by optimizing parameter sets consisting of object parameters comprising the steps of:

creating an initial population of a plurality of individual parameter sets based on the multimedia documents, the parameter sets comprising information sharing system object parameters for describing a model, structure, shape, design, process, search query set, and dynamic search space to be optimized;

setting the initial population as a population of memes, transmitting by the population of memes, cultural information resulting from an educational process;

transmitting cultural information comprises formulating the population of memes into nearest neighbor clusters by one of the steps consisting of random nearest neighbor, multiple neighborhoods, or overlapping neighborhoods wherein:

random nearest neighbor clustering comprises randomly selecting a first meme, and selecting a second meme by increasing an ID of the first meme, thereby mimicking the ring communication pattern based on the rank in order to determine adjacent memes;

multiple neighborhood clustering comprises a single meme that is a nearest neighbor of two non-overlapping nearest neighbor clusters where the single meme is selected as a nearest neighbor using proportional fitness selection;

overlapping neighborhood clustering comprises two or more nearest neighbor clusters where the selection of one of the nearest neighbor clusters is selected by roulette wheel selection or tournament selection;

generating nearest neighbor clusters until no nearest neighbor clusters of two or more memes are found; and repeating all steps until achieving a periodic optimal multimedia document clusters.

2. The method of claim 1 wherein the indexing, ranking, and clustering of each object parameter of the parameter set, forms a basis of cultural information transmission, leading to a migration of multimedia documents between memes.

3. The method of claim 2 wherein the object parameters of the parameter set of the first selected meme or member of nearest neighborhood clustering regulates cultural transmissions between selected memes.

4. The method of claim 1 wherein the transmission of cultural information between memes results in a parameter set variance and leads to variances in the object parameters for describing a meme to be optimized.

5. The method of claim 1 wherein the random selection process for nearest neighborhood clustering randomly selects one meme in a nondeterministic way as a result of the composition of the object parameters in the parameter set that describe each meme.

6. The method of claim 1 wherein the first randomly selected meme results in the emergence of subclustering and regulates the rate of transmitting cultural information between nearest neighbor clusters.

7. The method of claim 6 wherein the transmission of cultural information between nearest neighbor clusters results in a population variance and leads to variances in the object parameters, for describing the model, structure, shape, design, process, search query set, and dynamic search space to be optimized.

8. The method of claim 6 wherein said parameter sets are iteratively improved as a population of memes by evolving clusters of competing information sharing system objects over a dynamic search space.

9. The method of claim 1 including steps for optimizing a shape of the dynamic search space that enhances the quality of the nearest neighbor cluster solution spaces and allows for continuous updates and redistribution of multimedia documents.

10. A system that indexes, ranks, and clusters multimedia documents by optimizing memes consisting of parameter sets of object parameters comprising the steps of:

creating an initial population of a memes based on the multimedia documents, the parameter sets comprising information sharing system object parameters for describing a model, structure, shape, design, process, search query set, and dynamic search space to be optimized;

transmitting by the population of memes, cultural information resulting from an educational process;

generating nearest neighbor clusters until no nearest neighbor clusters of two or more memes are found; and repeating all steps until achieving a periodic optimal meme clusters.

11. The system of claim 10 wherein the indexing, ranking, and clustering of each meme, forms a basis of cultural information transmission, leading to a migration of multimedia documents between memes.

12. The system of claim 10 wherein the first selected meme or member of nearest neighbor clusters, regulates cultural transmissions between selected memes.

13. The system of claim 10 wherein the transmission of cultural information between memes results in a parameter set variance and leads to variances in the object parameters for describing a meme to be optimized.

* * * * *